(12) United States Patent
Griffoin et al.

(10) Patent No.: US 12,304,253 B2
(45) Date of Patent: May 20, 2025

(54) PNEUMATIC TIRE

(71) Applicant: The Goodyear Tire & Rubber Company, Akron, OH (US)

(72) Inventors: Jean-Claude Patrice Philippe Griffoin, Mertzig (LU); Bodo Ahrens, Trier (DE); Adrian Florin Nicula, Luxembourg (LU); Andreas Frantzen, Trier (DE)

(73) Assignee: The Goodyear Tire & Rubber Company, Akron, OH (US)

( * ) Notice: Subject to any disclaimer, the term of this patent is extended or adjusted under 35 U.S.C. 154(b) by 164 days.

(21) Appl. No.: 17/169,764

(22) Filed: Feb. 8, 2021

(65) Prior Publication Data

US 2021/0245556 A1    Aug. 12, 2021

Related U.S. Application Data

(60) Provisional application No. 62/971,460, filed on Feb. 7, 2020.

(51) Int. Cl.
| | |
|---|---|
| *B60C 19/00* | (2006.01) |
| *B60C 5/14* | (2006.01) |
| *B60C 19/12* | (2006.01) |

(52) U.S. Cl.
CPC .............. *B60C 19/002* (2013.01); *B60C 5/14* (2013.01); *B60C 19/122* (2013.01)

(58) Field of Classification Search
CPC ..... B60C 19/002; B60C 19/12; B60C 19/122; B60C 5/002
See application file for complete search history.

(56) References Cited

U.S. PATENT DOCUMENTS

| | | |
|---|---|---|
| 3,048,509 A | 8/1962 | Sweet et al. |
| 4,228,839 A | 10/1980 | Bohm et al. |
| 4,895,610 A | 1/1990 | Egan |

(Continued)

FOREIGN PATENT DOCUMENTS

| | | |
|---|---|---|
| CN | 101574899 A | 11/2009 |
| CN | 102910039 A | 2/2013 |

(Continued)

OTHER PUBLICATIONS

Machine translation of EP 3266627, 2018.*

(Continued)

*Primary Examiner* — Justin R Fischer
(74) *Attorney, Agent, or Firm* — Alvin T. Rockhill

(57) ABSTRACT

The present invention is directed to a pneumatic tire comprising a tread portion, two bead portions, two sidewalls extending between the tread portion and the respective bead portions, an inner surface defining a tire cavity, a sealant material layer covering the inner surface radially below the tread portion within the tire cavity, and at least one noise dampening strip which is partially covering and attached to the sealant material on a radially inner side and along a circumferential direction of the sealant material layer. The sealant material layer has at least one plateau region supporting the noise dampening element and one or more bottom regions provided laterally beside the plateau region, and wherein the plateau region extends out of the bottom regions in a radially inner direction.

13 Claims, 4 Drawing Sheets

(56) References Cited

U.S. PATENT DOCUMENTS

| | | | |
|---|---|---|---|
| 6,837,287 | B2 | 1/2005 | Smith, Sr. et al. |
| 7,607,466 | B2 | 10/2009 | Kim et al. |
| 8,360,122 | B2 | 1/2013 | Wilson |
| 9,677,025 | B2 | 6/2017 | Voge et al. |
| 9,802,446 | B2 | 10/2017 | Dahlke et al. |
| 10,086,577 | B2 | 10/2018 | Helfen et al. |
| 10,399,391 | B2 | 9/2019 | Majumdar et al. |
| 10,647,168 | B1 | 5/2020 | Nakatani et al. |
| 11,072,210 | B2 | 7/2021 | Schurmann |
| 2005/0161138 | A1 | 7/2005 | Yukawa et al. |
| 2005/0205183 | A1 | 9/2005 | Yukawa et al. |
| 2009/0272476 | A1 | 11/2009 | Wilson et al. |
| 2009/0277549 | A1 | 11/2009 | Tanno et al. |
| 2010/0307655 | A1 | 12/2010 | Tanno et al. |
| 2013/0048180 | A1 | 2/2013 | Song |
| 2018/0126803 | A1 | 5/2018 | Jacob et al. |
| 2019/0092103 | A1 | 3/2019 | Giannini et al. |
| 2019/0143764 | A1 | 5/2019 | Majumdar et al. |

FOREIGN PATENT DOCUMENTS

| | | | |
|---|---|---|---|
| CN | 105398291 A | | 3/2016 |
| CN | 105829145 A | | 8/2016 |
| DE | 102017210929 | * | 1/2019 |
| DE | 102018208457 A1 | | 12/2019 |
| EP | 1798075 A2 | | 6/2007 |
| EP | 2562009 A2 | | 2/2013 |
| EP | 3266627 | * | 1/2018 |
| EP | 3431309 A1 | | 1/2019 |
| EP | 3433112 B1 | | 8/2020 |
| JP | 2001191734 A | | 7/2001 |
| JP | 2005262920 A | | 6/2007 |
| JP | 2013112062 A | | 6/2013 |
| JP | 2013043643 A | | 10/2014 |
| JP | 2019064487 A | | 4/2019 |
| JP | 2018521900 A | | 7/2020 |
| JP | 2019515824 A | | 8/2021 |
| JP | 2018090131 A | | 10/2022 |
| KR | 101497839 B1 | | 3/2015 |
| KR | 1020190022930 A | | 3/2019 |
| KR | 20190115629 A | | 10/2019 |
| KR | 1020190139822 A | | 12/2019 |
| WO | 2018123484 A | | 7/2019 |

OTHER PUBLICATIONS

Chinese Office Action dated Sep. 1, 2022 for Chinese Patent Application No. 20210160465.3 which is the Chinese counterpart to the subject patent application.

Extended European Search Report for European Patent Application No. EP21155586 dated Jul. 8, 2021 which is the European counterpart to the subject patent application.

Notice of Preliminary Rejection dated Nov. 17, 2022 for Korean Patent Application No. 2021-0016429 which is the Korean counterpart to the subject patent application.

Rejection Notice dated Dec. 11, 2024 from Japanese Patent Office for Japanese Patent Application No. 2021-012092.

Notice of Allowance dated May 14, 2023 from Korean Intellectual Property Office for Korean Patent Application No. 10-20210016429.

* cited by examiner

PNEUMATIC TIRE

This application claims benefit of U.S. Provisional Patent Application Ser. No. 62/971,460, filed on Feb. 7, 2020. The teachings of U.S. Provisional Patent Application Ser. No. 62/971,460 are incorporated herein by reference in their entirety.

FIELD OF THE INVENTION

This invention relates to a pneumatic tire with puncture sealing and more particularly relates to a pneumatic rubber tire of the tubeless type having a puncture sealing feature. This invention specifically relates to a pneumatic tire, in particular a pneumatic tire having on its interior surface a sealant layer carrying at least one noise dampening element.

BACKGROUND OF THE INVENTION

The concept of pneumatic tires with puncture sealing properties is far from new and tires having puncture sealing capabilities are described extensively in the prior art. Such self-sealing pneumatic tires typically retard or prevent the loss of air pressure and consequential deflation of the tire after it has been punctured with a sharp object, such as a nail or screw.

Examples of self-sealing pneumatic tires date back to the early part of the twentieth-century. The tires described in these early references normally included a strip of unvulcanized (uncured) rubber which could flow into and seal a puncture before the tire became flat due to air loss. Over time more sophisticated tire constructions, sealant compositions and methods were developed wherein a sealant material is encased or encapsulated in between calendered layers within the tire (see U.S. Pat. Nos. 3,048,509, and 4,228,839).

Many additional methods, sealants and tire constructions have been suggested for puncture sealant pneumatic tires. However, all of these approaches have had certain drawbacks. For example, the use of fluid puncture sealant coatings which seal by flowing into the puncture hole has sometimes been unsuccessful primarily because sealant coatings may flow excessively and thus tend to cause the tire to become out of balance. Also, in some cases such a sealant coating is not operable or effective over a wide temperature range extending from summer to winter conditions. For instance, in some cases the sealant material may flow too freely in the hot temperatures that can be experienced during the summer and may not flow adequately under the conditions of cold temperature that can be experienced during the winter. Central cores of cellular material which will physically maintain the shape of the tire when punctured can place a restriction on the maximum speed of a vehicle on which they are used because of potential breakdown or destruction of the cells caused by the effects of heat and distortion. More complicated structures wherein the sealant material is encased in a vulcanized material are usually expensive to manufacture and can also create balance and suspension problems due to the additional weight of the tire.

U.S. Pat. No. 4,895,610 discloses a method of preparing a pneumatic rubber tire having a puncture sealing feature which comprises: (a) building an unvulcanized tire comprised of a circumferential rubber tread, a supporting carcass therefor, two spaced beads, two rubber sidewalls connecting said beads, an inner liner and a layer of polymer composition disposed inwardly from said supporting carcass and outwardly from said inner liner wherein said polymer composition consists of, based on its polymer content, 100 parts by weight butyl rubber having a number average molecular weight of 200,000 to 500,000, and a Mooney viscosity ranging from about 40 to 58, about 10 to 40 parts by weight of carbon black, about 5 to 35 parts by weight of polyisobutylene having a number average molecular weight of about 7,500 to 15,000, about 5 to 35 parts by weight of an oil extender, about 0 to 1 parts by weight sulfur, and about 1.0 to 8 parts by weight of a peroxide vulcanizing agent; and (b) shaping and vulcanizing said tire under conditions of heat and pressure and simultaneously forming in situ a puncture sealant layer in said tire by both crosslinking and partially depolymerizing said butyl rubber in said polymer composition. The peroxide vulcanizing agent which is used can be 2,5-bis(t-butyl peroxy)-2,5-dimethyl hexane; 1,1-di-t-butyl perioxi-3,3,5trimethyl cyclohexane; 2,5-dimethyl-2,5di(t-butyl peroxy) hexyne-3; p-chlorobenzyl peroxide; 2,4-dichlorobenzyl peroxide; 2,2,-bis (t-butyl peroxi)-butane; di-ti-butyl peroxide, benzyl peroxide; dicumyl peroxide; and 2,5-dimethyl-2,5di(t-butyl peroxy) hexane.

U.S. Pat. No. 6,837,287 discloses a pneumatic tire comprising an outer circumferential tread, a supporting carcass therefore and an inner (rubber) liner disposed inwardly from said supporting carcass, and a puncture sealant layer which is disposed between said carcass and said inner liner, wherein said puncture sealant layer comprises a partially depolymerized star branched butyl rubber layer which contains a dispersion of particulate precured resin-cured butyl rubber and/or sulfur-cured diene-based rubber.

U.S. Pat. No. 7,607,466 discloses a self-sealing tire comprising: (a) a tire body that is made of flexible and airtight material and is adapted to be assembled with a rim; (b) a partition wall; and (c) a sealant that is adapted to seal a puncture in the tire body; wherein the tire body has a circular shape, and comprises an outer circumferential wall that is adapted to contact the ground, a first sidewall and a second sidewall that extend from the outer circumferential wall, wherein the partition wall is provided between the first sidewall and the second sidewall and defines a partitioned space between the outer circumferential wall, the first sidewall, the second sidewall and the partition wall, wherein the sealant is filled in the partitioned space, wherein the partition wall comprises a partition membrane, wherein the partition membrane comprises a first edge that contacts the first sidewall, and a second edge that contacts the second sidewall, wherein the partition membrane forms an annulus that is concentric with the tire body, wherein the partition wall further comprises one or more dividing projections that are protruded from the partition membrane, wherein the dividing projections of the partition wall contact with the outer circumferential wall of the tire body, wherein each of the dividing projections forms an annulus that is concentric with the tire body, wherein the dividing projection comprises one or more communication holes whereby the sealant may flow through the communication holes.

U.S. Pat. No. 9,677,025 discloses an inflatable article such as a tire, comprising a puncture-resistant layer, said layer comprising an elastomer composition having a self-sealing property, wherein the composition comprises (phr meaning parts by weight per 100 parts of solid elastomer): a blend of at least two solid elastomers, a polybutadiene or butadiene copolymer elastomer, referred to as "elastomer A", and a natural rubber or synthetic polyisoprene elastomer, referred to as "elastomer B", the elastomer A: elastomer B ratio by weight being within a range from 10:90 to 90:10; between 30 and 90 phr of a hydrocarbon resin; and from 0 to less than 30 phr of filler.

U.S. Pat. No. 10,086,577 reveals a method of making a self-sealing pneumatic tire, the tire having a tread width and a radially innermost surface having a residue deposited thereon, comprising the steps of: activating a laser to generate laser radiation; directing a pulse of laser radiation to impinge on an area of the innermost surface, the pulse of radiation having a pulse width and a fluence sufficient to remove at least part of the residue in the area to form a cleaned area; repeating the step of directing the pulse of radiation sequentially over the innermost surface to form a sequence of cleaned areas, the sequence of cleaned areas defining a stripe, the stripe following a continuous nonlinear path extending at least one circumference about the inner surface, the stripe having a stripe width; applying a bead of sealant in a continuous bead path extending at least one circumference about the inner surface, the bead of sealant at least partially overlaying the stripe.

It is known in the prior art to provide noise dampening elements on such sealant material to reduce the noise created by the tire during driving, in particular noise resulting from tire cavity resonance. Unfortunately, the attachment of a noise dampening element on sealant material may negatively impact the sealing performance of the sealant material due to an interaction with the dampening element which may inhibit the sealant material from performing its function as a sealant in the case of a tire puncture. Moreover, the provision of sealant material and/or foam material on the inner liner of the tire may also result in heat build-up in areas covered by sealant and/or dampening material compared to a tire without such materials. It would therefore be desirable to provide an improved tire having a good sealant performance and/or limited heat build-up as well as low noise generation resulting from tire cavity resonance.

SUMMARY OF THE INVENTION

A first object of the present invention may be to provide an advanced pneumatic tire having a tire cavity with one or more sound dampening elements attached to a sealant material layer.

Another object of the present invention may be to provide an advanced pneumatic tire with one or more sound dampening elements and a sealant layer, the tire having good sealing properties and/or limited heat build-up, in particular radially above the sealant layer.

Still another object of the present invention is to provide a cost-efficient tire providing decent sound dampening and sealing properties.

Thus, in a first aspect of the invention, a pneumatic tire is provided, the tire comprising a tread portion, two bead portions, two sidewalls extending between the tread portion and the respective bead portions, an inner surface (optionally, formed by an inner liner) defining a tire cavity, a sealant material layer covering the inner surface radially below (or radially inside of) the tread portion within the tire cavity, at least one noise dampening strip or element which is partially covering and attached to the sealant material along a circumferential direction and on a radially inner side of the sealant material layer. The sealant material layer has at least one plateau region supporting the noise dampening strip and one or more bottom regions provided axially beside the plateau region, and wherein the plateau region extends out of the bottom regions in a radially inner direction. In other words, the plateau region or region supporting the noise dampening strip is elevated in a radially inner direction with respect to the bottom regions. The tire according to the invention comprising a plateau region of sealant material below the noise dampening strip provides a larger amount of sealant material below the dampening strip. The thickness of the sealant material in the bottom region axially beside the dampening strip is smaller than in the plateau region which improves cooling of the tire in the bottom regions towards the tire cavity. At the same time the increased thickness of the sealant layer in the plateau region helps to provide good sealing performance although the flow of sealant material may be restrained between the inner surface of the tire and the noise dampening strip in case of a puncture. Thus, a larger sealant thickness is provided where needed (i.e. under the dampening strip) and a smaller sealant thickness is provided axially beside the dampening strip so as to save costs and improve heat conductivity in these bottom regions.

In one embodiment, the plateau region extends at most by 20% (or in one embodiment by at most 10%) of a total axial width of the sealant material layer beyond each lateral or axial side of the noise dampening strip. In particular, it may not be desirable to have a plateau region which is much larger than the bottom surface of the noise dampening strip as this may result in decreased heat conductivity and higher costs for sealant material. Nevertheless, it may be desirable to have a plateau region that extends axially beyond the noise dampening strip attached to the sealant layer in the plateau region. This can for example help to ensure that even a slightly misplaced noise dampening strip is still supported by a sufficient amount of sealant material.

In another embodiment, the bottom regions extend, axially beside the noise dampening strip, over 20% to 80% of a total axial width of the sealant layer. Thus, the bottom regions extend over a substantial part of the surface or width of the sealant material layer.

In another embodiment, the plateau region axially extends at least over the axial width of the noise dampening strip. This may help to provide a good support to the noise dampening strip.

In another embodiment, the plateau region axially extends at most over the axial width of the noise dampening strip.

In another embodiment, the plateau region axially extends over a width within a range of 60% to 90% of the axial width of the noise dampening strip. Such a relatively narrow plateau may save sealant material and reduce heat build-up.

In another embodiment, the plateau region axially extends continuously over a width within a range of 60% to 90% of the axial width of the noise dampening strip. A continuous extension may help to avoid air pockets which may impair cooling.

In such embodiments, the plateau region extends only radially below the noise dampening strip (i.e. not axially beside the noise dampening strip).

In another embodiment, the plateau region extends axially (and preferably continuously) over a width within a range of 60% to 120% of the axial width of the noise dampening strip. Thus, in such an embodiment the plateau region may also be broader than the axial width of the noise dampening strip. Again, such a feature may help to ease placement of the strip. In another embodiment, the axial width of the sealant material layer is within a range of 60% to 95% (preferably, 65% to 90%) of the total tire width. The total tire width is determined as the maximum axial (outer) width of the tire in an unmounted and uninflated state.

In another embodiment, the noise dampening strip comprises a porous material and/or one or more of the following materials: polyurethane foam (e.g. polyether-urethanes, polyester-urethanes), melamine foam, polypropylene foam, foamed rubber (e.g. EPDM, Neoprene based), natural material-based foam (e.g. cellulose, chitosan-based foams), nonwoven material (e.g. felt from melt-blown, spun laid or electro spun or natural fiber of polyester, polyamide, PE, PET, PP, cellulose, cotton, wool or silk). In other words, the noise damping strip may be made of a porous material. In particular, when using such materials, a larger thickness of sealant material may be desirable within the plateau region so as to improve puncture sealing performance. The terms damping and dampening are used interchangeably herein.

In still another embodiment, multiple noise dampening strips are arranged (preferably essentially in parallel) along the circumferential direction. The provision of multiple strips may reduce the size of continuous regions covered by noise dampening material and may thus improve the heat build-up behavior in the tire radially above the strips. A respective plateau region to which such a strip is attached may also extend along the circumferential direction.

In yet another embodiment, the strip extends along a circumferential length which corresponds to at least 50% (preferably, at least 80%) of an inner circumference of the tire, measured along the inner surface at an axial center of the tire.

In yet another embodiment, the axial width of the noise dampening strip is within a range of 20% to 50% of the total axial width of the sealant material layer. In particular, it may be desirable to a have a limited axial width of the noise dampening strip in order to avoid unnecessary heat build-up in a region of the tire at which the noise dampening element is attached. In general, the noise dampening strips could have polygonal, e.g. rectangular cross-sections in non-limiting examples.

In still another embodiment, the plateau region has an essentially constant thickness. Essentially constant thickness shall mean herein that the thickness does not deviate more than 10% (or even not more than 5%) from the average thickness value.

In still another embodiment, the thickness of the plateau region is at least 15%, preferably at least 20% larger than the thickness of the bottom regions. In general, thicknesses of the sealant material layer are measured perpendicular to the inner surface of the tire (to which the sealant material is attached), e.g. perpendicular to the inner liner, if present. In case regions, in particular bottom regions, have a varying thickness (e.g. varying along a lateral or axial direction), thickness is to be understood as an average thickness. The term lateral direction shall include herein for instance axial and circumferential directions.

In still another embodiment, the thickness of the plateau region is at most 100% larger than the thickness of the bottom regions. For instance, the thickness of the plateau region can be 15% to 100% greater than the thickness of the bottom regions. The thickness of the plateau region can be 20% to 90% greater than the thickness of the bottom regions, 30% to 80% greater than the thickness of the bottom regions, or 40% to 70% greater than the thickness of the bottom regions.

In still another embodiment, the bottom regions have, preferably over at least 80% of their axial width, an essentially constant sealant material thickness measured (along and) perpendicular to the inner surface. A definition for essentially constant thickness has already been given above.

In still another embodiment, the sealant material layer has shoulder regions (laterally) extending between the plateau region and the bottom regions. In other words, said shoulder regions may be adjacent said plateau region and/or the bottom region.

In still another embodiment, (each of) said shoulder regions axially extend over less than 10% of the axial width of the sealant material layer.

In still another embodiment, the noise dampening strip is free of a coating and/or foil facing the sealant material layer. In particular, such an embodiment helps to provide a cost-efficient tire.

In still another embodiment, the noise dampening strip is a polymeric foam element having a density within a range of 0.01 g/cm$^3$ to 1 g/cm$^3$.

In still another embodiment, the noise dampening strip or material can be comprised of one or more of the following: polyurethane foam, polyethylene foam, foam rubber, and the like. Suitable polyurethane foams are typically made by the polymerization of a diisocyanate and a polyol in the presence of a suitable blowing agent. A wide variety of rubber foams can be utilized in the practice of this invention with natural rubber, synthetic polyisoprene rubber, polybutadiene rubber, nitrile rubber, and styrene-butadiene rubber foams being commonly used. Such foam rubbers are typically made by foaming a natural or synthetic rubber latex with a chemical foaming agent. The chemical foaming agent will typically be an azo compound, such as azodicarbonamide, a hydrazine compound, a carbazide, a tetrazole, a nitroso compound, and/or a carbonate, such as sodium bicarbonate.

In another embodiment, the noise dampening element is made of open cell foam material. Preferably such material comprises from 55% to 95% (or preferably from 60% to 90%) open cells (of all cells) in the material. An open cell can be understood as a cell having at least one aperture. In other words, open cells are not fully closed or not fully enclosed by a cell wall. Closed cell foam does not fall into the above range as most cells of this foam type are closed. Fully or almost fully reticulated foam does not fall under that range either as it has almost no walls and constitutes rather an open grid. Whether cells are open or not (i.e. closed) can for instance be determined by light microscopy, SEM or NMR. Cell sizes could typically range from 10 µm to 1 mm (maximum diameter).

In another embodiment, the noise dampening material is adapted and/or used for dampening tire cavity noise, in particular in the range from 100 Hz to 300 Hz or in the range from 100 Hz to 200 Hz or from 200 Hz to 300 Hz. The term tire cavity, as mentioned herein, shall be the volume enclosed by the inner surface of the tire (or, if present, by the inner liner of the tire), especially in an unmounted and uninflated state, and closed by an (imaginary) circumferential ring-shaped plane contacting the radially innermost edges of both bead portions.

In still another embodiment, the pneumatic tire has further a carcass and a belt portion arranged between the tread portion and the carcass.

In still another embodiment, the sealant material layer comprises or is made of:
i) axially adjacent sealant material strips extending circumferentially about an axis of the tire and along the inner surface of the tire;
ii) one or more sealant material strips spirally wound about an axis of the tire and along the inner surface of the tire;
in particular so as to form the sealant material layer, and/or more particularly so as to form an axially continuous sealant material layer.

As these strips may have other than rectangular cross sections, such as essentially elliptic, essentially circular or essentially polygonal cross-sections, providing such strips adjacent each other may result in a roughness of the surface with a wave-shaped surface profile. The plateau region and the bottom regions may exhibit such slight surface patterns which result from manufacturing.

In still another embodiment, said sealant material strips have a larger thickness in the plateau region than in the bottom regions (e.g. corresponding to the above-mentioned embodiments of layer thickness). Alternatively, or in addition, multiple sealant material strips or layers of sealant material strips are arranged (radially) on top of one another in the plateau region (e.g. so as to form the plateau region). For instance, this could be two layers of strips on top of each other. Such arrangements are particularly helpful for providing the plateau region extending out of the bottom region(s).

In still another embodiment, one or more sealant material strips are arranged spirally (e.g. with an angle smaller than 5° or even smaller than 2° with respect to the equatorial plane (EP) of the tire) or essentially circumferentially (i.e. with an angle of about 0° or 0° with respect to the equatorial plane of the tire) and along the inner surface of the tire.

In still another embodiment, the dampening strip extends about the (center) axis of the tire. In other words, the dampening strip may be spirally attached to the sealant layer.

In still another embodiment, the plateau region has a (radial) thickness which is within a range of 3 mm to 10 mm (preferably 3 or 4 mm to 8 mm) and bottom regions have a thickness which is within a range of 2 mm to 6 mm (preferably 3 mm to 5 mm). Preferably, the difference in thickness is at least 0.5 mm, at least 0.8 mm or even at least 1 mm or even at least 1.5 mm. In addition, or alternatively, the difference in thickness may be at most 3 mm, preferably at most 2 mm or at most 1.5 mm.

In still another embodiment, the noise dampening strip adheres (directly) to the sealant material. In other words, the interface between sealant material and noise dampening element is free of additional adhesives or glues. It is rather the stickiness of the sealant material which holds the noise dampening strip in place.

In yet another embodiment, the sealant material is one or more of: a butyl rubber-based composition, a polybutene-based composition, a polyisoprene-based composition, a natural rubber-based composition, a polyurethane-based composition, an emulsion styrene-butadiene rubber-based composition, an EPDM-based composition, and a silicone-based composition. For instance, the sealant material can be a blend of butyl rubber and polyisobutylene as described in U.S. Pat. No. 4,895,610. The teachings of U.S. Pat. No. 4,895,610 are incorporated herein by reference for the purpose of describing such blends of and the method by which they can be incorporated into a tire. In another embodiment, the sealant material can be comprised of expanded solids comprising expandable graphene structures and microspheres as described by U.S. Pat. No. 9,802,446. The teachings of U.S. Pat. No. 9,802,446 are incorporated herein by reference for the purpose of describing such sealant materials. The sealant material composition can in another embodiment be comprised of at least one non-halogenated butyl rubber, and 2,2'-dibenzamido-diphenyldisulfide, the sealant material composition having a viscosity that permits the sealant material composition to be incorporated into a tire during a tire building process and to degrade to a lower viscosity that permits the resulting degraded sealant material composition to flow into and seal a puncture in a tire. This sealant composition is described in greater detail in U.S. Pat. No. 8,360,122. The teachings of U.S. Pat. No. 8,360,122 are incorporated herein by reference for the purpose of describing such sealant compositions.

In a second aspect of the invention, a pneumatic tire is provided, the tire comprising a tread portion, two bead portions, two sidewalls extending between the tread portion and the respective bead portions, an inner surface defining a tire cavity, a sealant material layer covering the inner surface radially below the tread portion within the tire cavity, at least one noise dampening element which is partially covering and attached to the sealant material on a radially inner side of the sealant material layer, wherein the sealant material layer has at least one plateau region supporting the noise dampening element and one or more bottom regions provided laterally beside the plateau region, and wherein the plateau region extends out of the bottom regions in a radially inner direction. The sealant material layer comprises A) one or more sealant material strips spirally wound about an axis of the tire and along the inner surface of the tire, or B) axially adjacent sealant material strips extending circumferentially about an axis of the tire and along the inner surface of the tire, (so as to form the sealant material layer). Advantages of the provision of a plateau region have already been described above. Moreover, the provision of the sealant material layer by one or more (essentially parallel) strips is particularly desirable as this allows an efficient creation of the plateau and bottom regions with different thickness.

In one embodiment, said sealant material strips have a larger thickness in the plateau region than in the bottom regions. This manner of application allows an easy provision of the plateau region in mass production.

In another embodiment, multiple layers of sealant material strips are arranged on top of each other in the plateau region. This is another preferred way to provide a plateau region, in particular in mass production.

In yet another embodiment, the noise dampening element has one or more of the following shapes: strip, block, and sheet. The shape may be chosen based on the specific application. Noise dampening strips may have the advantage of easier application in mass production, in particular when requiring a relatively large volume of noise dampening material.

In still another embodiment, the noise dampening element is a noise dampening foam block or sheet and wherein a plurality of such blocks or sheets are, preferably spaced apart from each other, attached to the sealant layer.

In still another embodiment, the plateau region extends at most by 20% (or in one embodiment by at most 10%) of a total axial width of the sealant material layer beyond each lateral or axial side of the noise dampening element. In particular, it may not be desirable to have a plateau region which is much larger than the bottom surface of the noise dampening element as this may result in decreased heat conductivity and higher costs for sealant material. Nevertheless, it may be desirable to have a plateau region that extends laterally or axially beyond the noise dampening element attached to the sealant layer in the plateau region. This can for example help to ensure that even a slightly misplaced noise dampening strip is still supported by a sufficient amount of sealant material.

In another embodiment, the plateau region laterally or axially extends at least over the lateral or axial width of the noise dampening element.

In another embodiment, the plateau region laterally or axially extends at most over the lateral or axial width of the noise dampening element.

In another embodiment, the plateau region laterally or axially extends over a width within a range of 60% to 90% of the lateral or axial width of the noise dampening element.

In another embodiment, the plateau region laterally or axially extends continuously over a width within a range of 60% to 90% of the lateral or axial width of the noise dampening element.

In such embodiments, the plateau region extends only radially below the noise dampening element(s) (i.e. not axially beside the noise dampening elements).

In another embodiment, the plateau region extends laterally or axially (and preferably continuously) over a width within a range of 60% to 120% of the lateral or axial width of the noise dampening element. Thus, in such an embodiment the plateau region may also be broader than the lateral or axial width of the noise dampening element.

In another embodiment, the bottom regions extend, laterally or axially beside the noise dampening element, over 20% to 80% of a total axial width of the sealant layer. Thus, the bottom regions extend over a substantial part of the surface or width of the sealant material layer.

In another embodiment, the axial width of the sealant material layer is within a range of 60% to 95% (preferably, 65% to 90%) of the total tire width.

In another embodiment, the noise dampening element comprises a material as already described above with respect to the noise dampening strip.

In still another embodiment, multiple noise dampening strips are arranged (preferably essentially in parallel) along the circumferential direction.

In yet another embodiment, the noise dampening strip extends or the strips extend along a circumferential length which corresponds to at least 50% (preferably, at least 80%) of an inner circumference of the tire, measured along the inner surface at an axial center of the tire.

In yet another embodiment, the axial width of the noise dampening element is within a range of 20% to 50% of the total axial width of the sealant material layer. In particular, it may be desirable to a have a limited axial width of the noise dampening element in order to avoid unnecessary heat build-up in a region of the tire at which the noise dampening element is attached.

In still another embodiment, the plateau region has an essentially constant thickness. Essentially constant thickness shall mean herein that the thickness does not deviate more than 10% (or even not more than 5%) from the average thickness value (here over the plateau region).

In still another embodiment, the thickness of the plateau region is at least 15%, preferably at least 20% larger than the thickness of the bottom regions. In general, thicknesses of the sealant material layer are measured perpendicular to the inner surface of the tire (to which the sealant material is attached), e.g. perpendicular to the inner liner, if present. In case regions, in particular bottom regions, have a varying thickness (e.g. varying along a lateral direction), thickness is to be understood as an average thickness.

In still another embodiment, the thickness of the plateau region is at most 100% larger than the thickness of the bottom regions. For instance, the thickness of the plateau region can be 15% to 100% greater than the thickness of the bottom regions. The thickness of the plateau region can be 20% to 90% greater than the thickness of the bottom regions, 30% to 80% greater than the thickness of the bottom regions, or 40% to 70% greater than the thickness of the bottom regions.

In still another embodiment, the bottom regions have, preferably over at least 80% of their (maximum) axial width, an essentially constant sealant material thickness measured (along and) perpendicular to the inner surface. A definition for essentially constant thickness has already been given above.

In still another embodiment, the sealant material layer has shoulder regions (laterally) extending between the plateau region and the bottom regions. In other words, said shoulder regions may be adjacent said plateau region and/or the bottom region.

In still another embodiment, (each of) said shoulder regions laterally, in particular axially, extends over less than 10% of the axial width of the sealant material layer.

In still another embodiment, the noise dampening element is free of a coating and/or foil facing the sealant material layer. In particular, such an embodiment helps to provide a cost-efficient tire.

In still another embodiment, the noise dampening element is a polymeric foam element having a density within a range of 0.01 $g/cm^3$ to 1 $g/cm^3$.

In still another embodiment, the noise dampening element can be the same materials as already mentioned above in relation to the noise dampening strip.

In still another embodiment, the sealant material strip(s), or in other words bead(s), form together the sealant material layer.

In still another embodiment, the one or more sealant material strips are arranged spirally (e.g. with an angle smaller than 5° or even smaller than 2° with respect to the equatorial plane (EP) of the tire) or essentially circumferentially (i.e. with an angle of about 0° or 0° with respect to the equatorial plane of the tire) and along the inner surface of the tire.

In still another embodiment, the dampening strip extends about the (center) axis of the tire. In other words, the dampening strip is spirally attached to the sealant layer.

In still another embodiment, the plateau region has a (radial) thickness which is within a range of 3 mm to 10 mm (preferably 3 or 4 mm to 8 mm) and bottom regions have a thickness which is within a range of 2 mm to 6 mm (preferably 3 mm to 5 mm). Preferably, the difference in thickness is at least 0.5 mm, at least 0.8 mm or even at least 1 mm or even at least 1.5 mm. In addition, or alternatively, the difference in thickness may be at most 3 mm, preferably at most 2 mm or at most 1.5 mm.

In still another embodiment, the noise dampening element adheres (directly) to the sealant material. In other words, the interface between sealant material and noise dampening element is free of additional adhesives or glues. It is rather the stickiness of the sealant material which holds the noise dampening strip in place.

In a third aspect of the invention, a method of manufacturing a pneumatic tire is provided, the method comprising one or more of the following steps:

(1) Providing a pneumatic tire comprising two (axially opposite) bead portions, a tread portion and two sidewalls connecting or joining the respective bead portion(s) with the tread portion;

(2) Curing (or in other words vulcanizing) the tire;

(3) Forming a sealant material layer on an inner surface (e.g. on an inner liner) of the cured tire by applying one or more sealant material strips onto said inner surface, and forming at least one plateau region of sealant material in said sealant material layer, extending out of one or more bottom regions in said sealant material layer;

(4) Attaching onto the at least one plateau region at least one noise dampening element.

In one embodiment, the sealant material layer is formed by applying one or more sealant material strips spirally about an axis of the tire and along the inner surface of the tire.

In another embodiment, the step of forming the sealant material layer comprises rotating the tire about its rotation axis and extruding the sealant material strips onto the rotating inner surface of the tire.

In still another embodiment, the strips are extruded by an extrusion head and/or die which is movable or moved in an axial direction of the tire during extrusion of the sealant material strips. Together with said rotation of the tire, circumferential or spiral strips may be applied to the inner surface of the tire.

In another embodiment, the sealant material layer is formed by applying (at the same time or subsequently) axially adjacent sealant material strips extending circumferentially about an axis of the tire and along the inner surface of the tire.

In still another embodiment, said strips are extruded or applied with a larger thickness in the plateau region than in the bottom regions.

In still another embodiment, multiple layers of strips (in particular 2 or 3 layers) are arranged on top of each other in the plateau region.

In still another embodiment, the sealant material strips have an axial width within a range of 2 mm to 15 mm, preferably 5 mm to 12 mm, or even more preferably 7.5 mm to 12 mm or 8 mm to 15 mm.

In still another embodiment, the thickness of the sealant material strips is at least 15 percent larger in the plateau region than in the bottom regions.

In still another embodiment, the larger thickness of sealant material strips in the plateau region is provided by one or more of: extruding the sealant material strips with higher speed than in the bottom regions; extruding the sealant material strips with higher pressure than in the bottom regions; using (extrusion) dies with larger outlet diameters; using extrusion dies with adjustable, in particular enlargeable, outlet diameters; rotating the tire slower about its rotation axis when extruding the strips in the plateau region than when extruding the strips in the bottom regions.

The above described application of sealant material strips is of particular interest for the use of noise dampening strips essentially extending in a circumferential direction. However, even in the case of using noise dampening blocks, circumferentially discontinuous strips or sheets, it would be possible to create also bottom regions circumferentially between plateau regions, such as by the methods of the aforementioned embodiment.

In still another embodiment, the method further comprises a step of applying a first layer of one or more sealant material strips, the first layer of sealant material layer strips forming the bottom regions and a bottom portion of the plateau region, and a further step of applying a second layer of one or more sealant material strips, the second layer of sealant material strips forming a top portion of the plateau region.

In general, the features of different aspects and embodiments of the invention as well as of the present description can be combined with one another.

BRIEF DESCRIPTION OF THE DRAWINGS

The structure, operation and advantages of the invention will become more apparent upon contemplation of the following description taken in conjunction with the accompanying drawings, wherein.

DETAILED DESCRIPTION OF THE INVENTION

Figure 1:
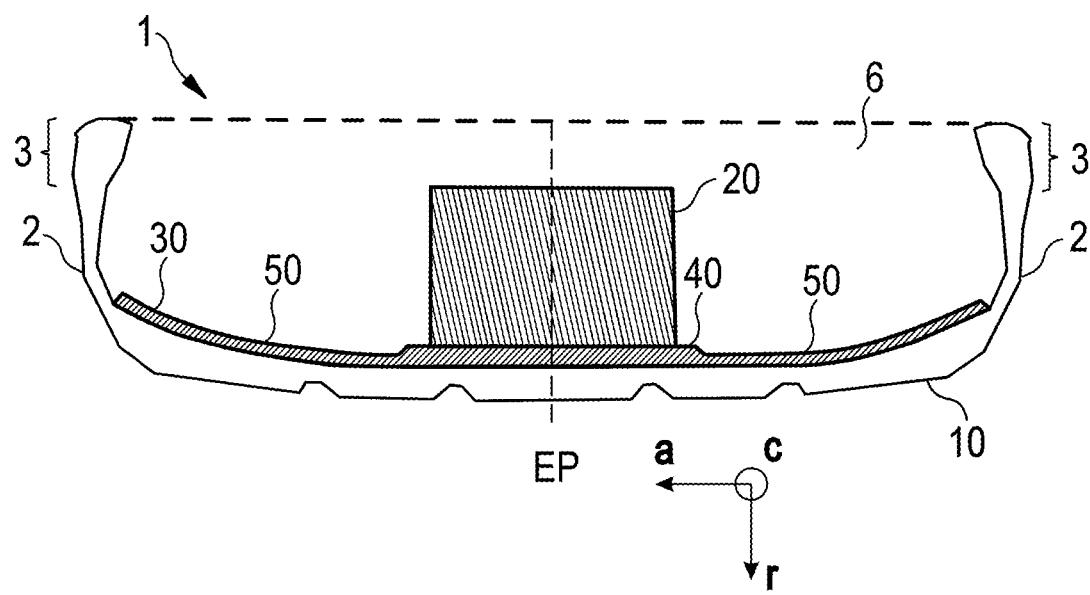
FIG. 1 shows a schematic cross section of an embodiment of a tire comprising a noise dampening strip attached to a sealant material layer within the tire cavity.

FIG. 1 is a schematic cross-section of a tire 1, in accordance with a non-limiting embodiment of the invention. The example tire 1 has a tread portion 10, two bead portions 3, and two sidewalls 2 joining outer axial edges of the tread portion 10 with the respective bead portions 3. Such tire constructions are as such known in the tire art. The tire 1 has an inner surface defining a tire cavity 6. Optionally, the tire may have an inner liner (not shown in FIG. 1) defining the tire cavity 6. A sealant material layer 30 is provided on the inner side or surface of the tire 1 in an area opposite to the tread portion 10. The sealant material layer preferably extends in circumferential direction c and in axial direction a along the inner surface of the tire 1. A noise dampening element, such as a foam strip 20 is attached to the sealant material layer 30 in a plateau portion or region 40 of the sealant material layer 30. In the present non-limiting example, the foam strip 20 extends in the circumferential direction and is directly attached to the sealant material layer 30 on a radially inner side of the plateau region 40. Axially beside or adjacent the plateau region 40, the sealant material layer comprises two bottom portions or regions 50 in which the sealant material layer 30 has a smaller thickness than in the plateau region 40. In particular, the plateau region 40 is not created by an elevation in the inner surface of the tire 1, e.g. of the inner liner in this example. In the present embodiment, the foam strip 20 is arranged along an axial center line of the tire 1, or in other words essentially in parallel to the equatorial plane EP of the tire 1.

For the sake of better comprehensibility, the axial direction a, the circumferential direction c and the radial direction r have been indicated in FIG. 1 as commonly used in the description of tire geometries. The term direction shall not be limited to a certain orientation unless otherwise indicated herein. An axial direction a may be understood as a direction in parallel to the rotation axis of the tire 1. The circumferential direction c is concentric to the rotation axis of the tire 1 and the radial direction r extends radially from the latter as common in the tire art.

As visible in FIG. 1, the amount of sealant material is smaller in the bottom regions 50 than in the plateau region 40. Limiting the amount of sealant material axially beside the foam strip 20 reduces costs and improves heat conductivity of the tire 1 towards the tire cavity 6. The larger material thickness in the plateau region 40 improves sealing performance under the foam strip 20. In particular, it has been found by the inventors that the same thin sealant material thickness supporting the foam strip 20 as in the bottom regions 50 would not always result in the desired sealing performance.

Figure 2:
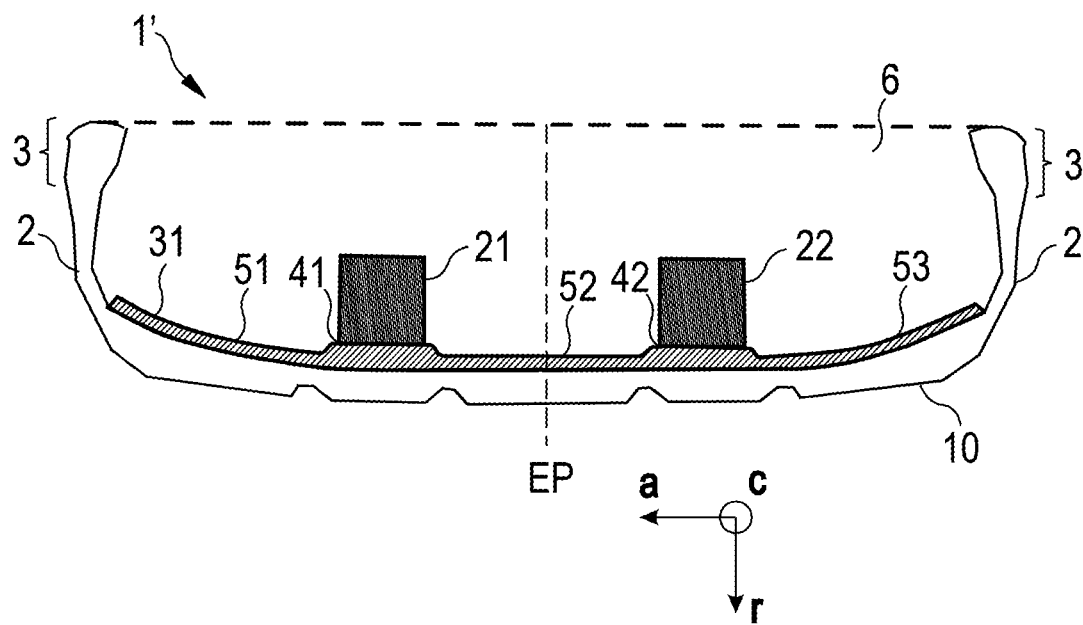
FIG. 2 shows a schematic cross section of another embodiment of a tire comprising two noise dampening strips attached to a sealant material layer within the tire cavity.

FIG. 2 shows another embodiment of a tire 1', the tire 1' having similar to tire 1 of FIG. 1 a tread portion 10, sidewalls 2, bead portions 3, a cavity 6, and a sealant material layer 31. In contrast to the embodiment shown in FIG. 1, the embodiment of FIG. 2 has two plateau regions 41, 42 and three bottom regions 51, 52, 53. To each one of the plateau regions 41, 42 is attached a foam strip 21, 22. Similar to the first embodiment, the sealant material layer 31 has in the bottom regions 51, 52, 53 a smaller thickness, in particular measured perpendicular to the inner surface of the tire 1', than in the plateau regions 41, 42.

As shown in FIG. 1, the plateau regions 41, 42 may be slightly axially broader than the axial width of the foam strips 21, 22. This may help to ease the positioning and/or application of the strips 21, 22 onto the sealant material in the plateau regions 41, 42.

Figure 3:
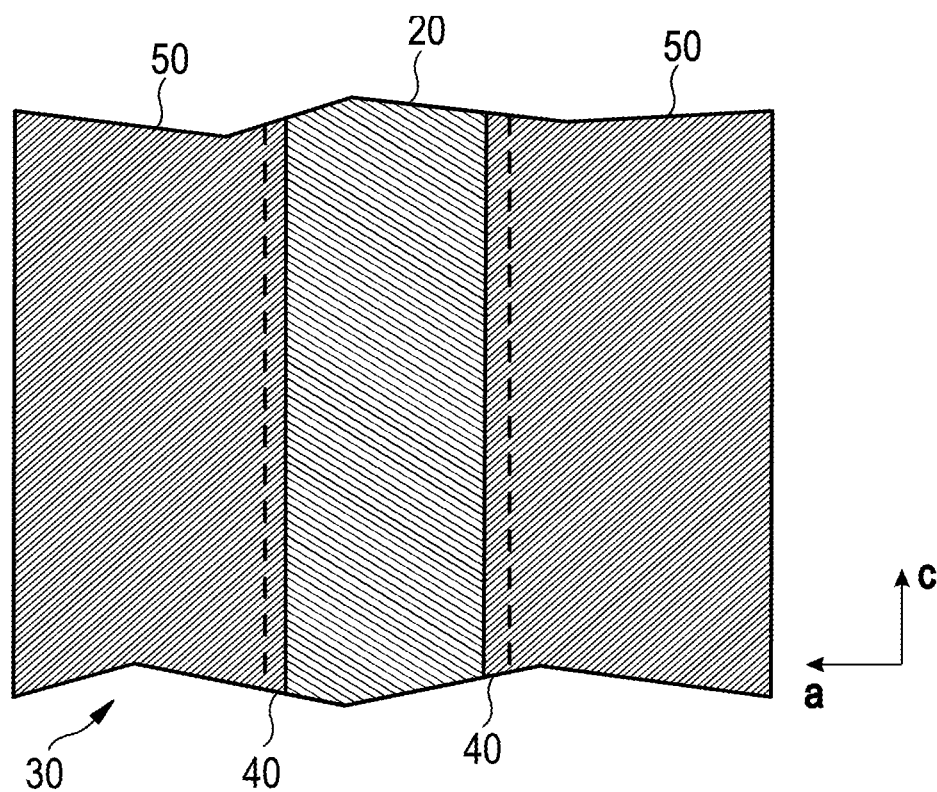
FIG. 3 shows a schematic partial top view onto the sealant material layer of FIG. 1, viewed from a radially inner position within the tire cavity.

FIG. 3 shows a schematic top view of the sealant material layer 30 of FIG. 1 within the tire cavity. The foam strip 20 is attached to the sealant material layer 30 in the plateau region 40. The bottom regions 50 are provided on both axial sides of the plateau region 40.

Figure 4:
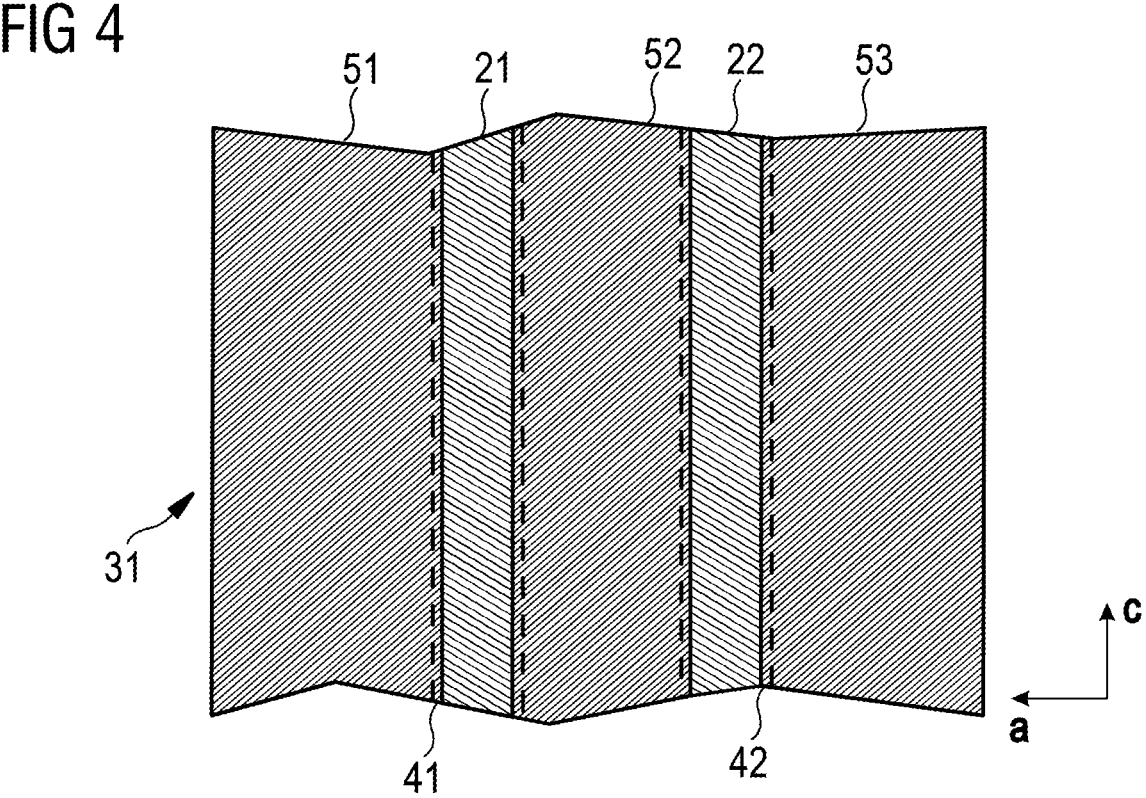
FIG. 4 shows a schematic partial top view onto the sealant material layer of FIG. 2, viewed from a radially inner position within the tire cavity.

FIG. 4 shows another schematic top view, i.e. a top view of the embodiment as already discussed with respect to FIG. 2. As visible in FIG. 4, the two foam strips 21, 22 are attached to the sealant material layer 31 in plateau regions 41 and 42. On each side of the respective plateau regions 41, 42 a respective bottom region 51, 52, 53 is provided.

Figure 5:
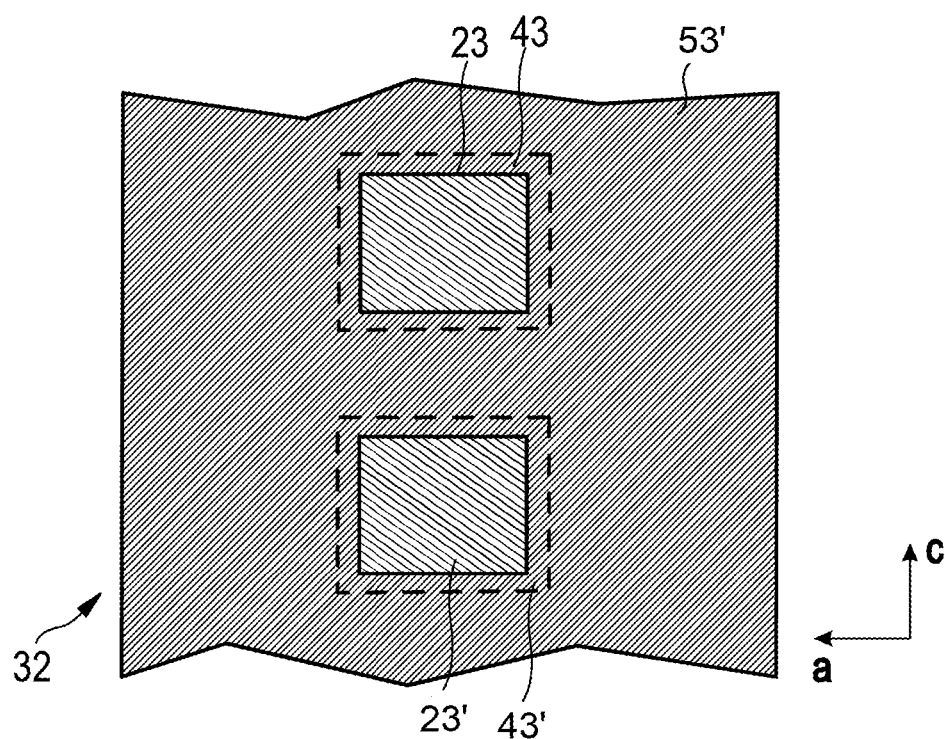
FIG. 5 shows a schematic partial top view onto another embodiment of a sealant layer carrying two block-shaped noise dampening elements.

In accordance with the embodiment of FIG. 5, instead of strip-shaped noise dampening elements, block-shaped noise dampening elements are provided on a sealant material layer 32. Thus, two noise dampening blocks 23, 23', e.g. foam blocks, are positioned on plateau regions 43, 44. In this embodiment, the blocks 23, 24 and plateau regions 43, 44 have an essentially rectangular shape. However, the present invention shall not be limited to such shapes. Rather the shape of the blocks or sheets of noise dampening material could have other shapes and the shape of corresponding plateau regions could be chosen accordingly. The plateau regions 43, 43' are surrounded by a bottom portion 53'. In other words, the plateau regions 43, 44 extend or protrude out of a laterally neighboring bottom portion. In particular, "laterally" includes axial and/or circumferential directions. While the noise dampening blocks 23, 24 have been shown in an axial center position of the sealant material layer 32, other positions would be possible, such as an arrangement axially beside each other.

Figure 6:
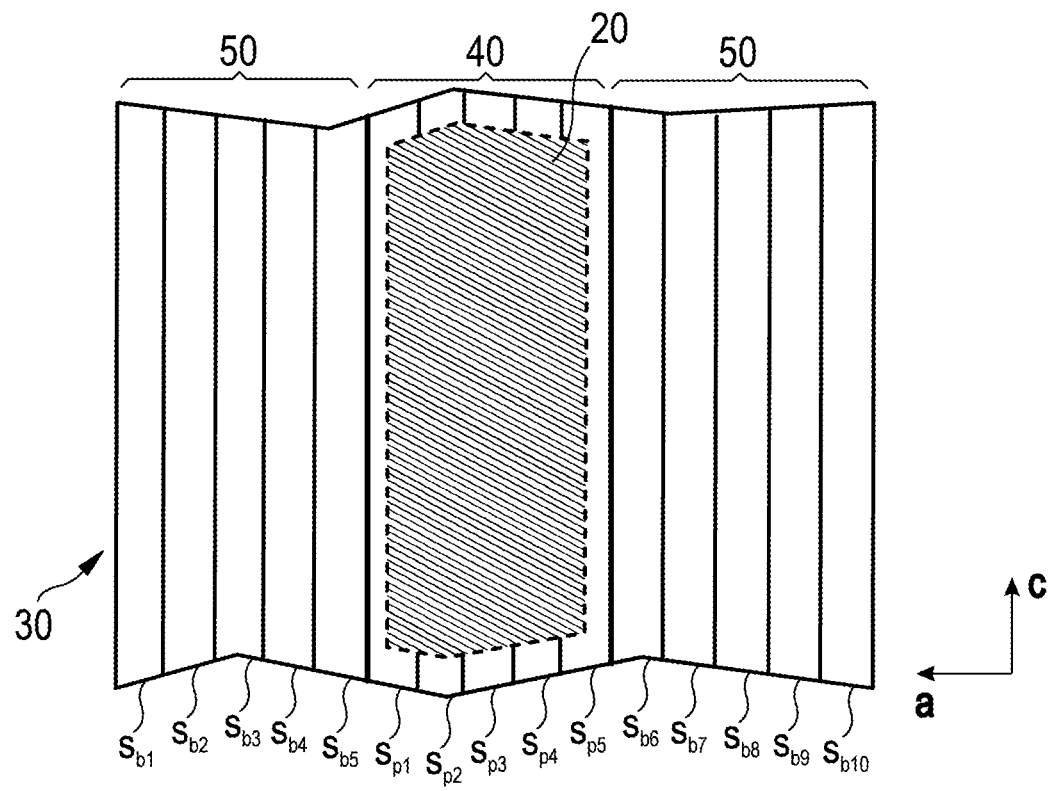
FIG. 6 shows a schematic partial top view of a sealant material layer with the attached noise dampening strip of FIG. 1, in which circumferential sealant material strips are schematically indicated.

FIG. 6 shows again schematically the arrangement already shown in FIG. 1, including more details about an example of potential application and structure of the sealant material layer 30. In this embodiment, the sealant material layer 30 comprises a plurality of essentially circumferential adjacent strips $s_{bi}$ and $s_{pi}$, wherein the strips $s_{bi}$ have been extruded or applied onto the inner surface of the tire (not shown as such) with a first thickness essentially corresponding to the thickness of the bottom portion 50 and the strips $s_{pi}$ have been extruded or applied with a second thickness essentially corresponding to the thickness of the plateau region 40. The foam strip 20 is attached afterwards onto the plateau region 40. Preferably, the strips touch each other and/or are essentially free of overlaps so as to provide a smooth and/or continuous radially inner surface. In another embodiment, not shown, it would be possible to apply a first layer of strips with essentially the same thickness in regions 40 and 50 and applying a second layer of strips only in region 40, so as to create the plateau region 40 with a larger thickness than in the bottom region 50.

Figure 7:
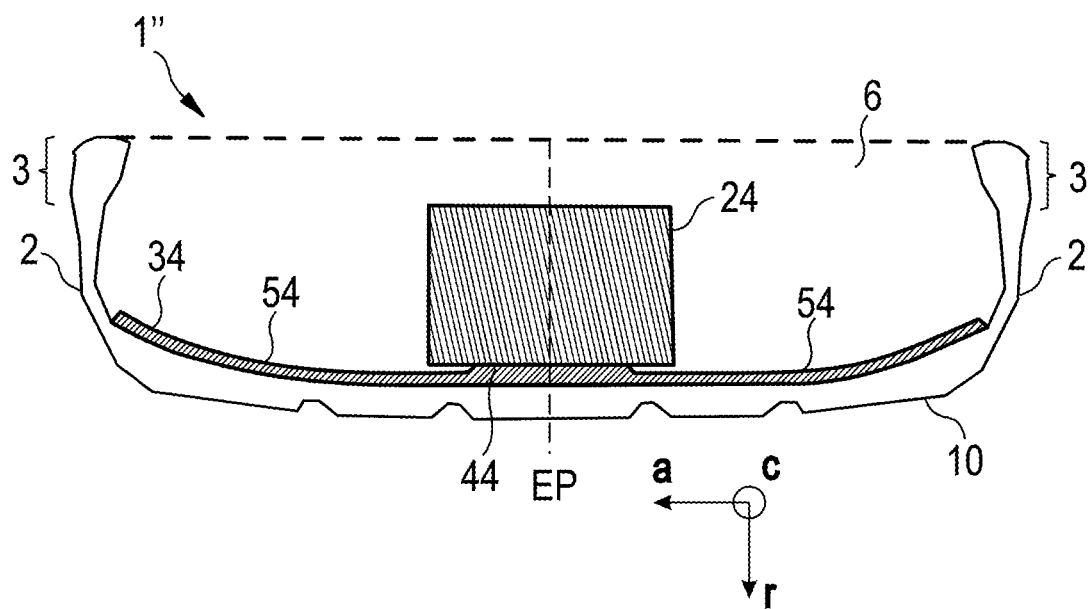
FIG. 7 shows a schematic cross section of an embodiment of a tire comprising a noise dampening strip attached to a plateau region of sealant material which is narrower than the noise dampening strip.

FIG. 7 shows another embodiment of a tire 1'' with elements already shown in FIGS. 1 and 2. In contrast to the embodiments of those, the noise dampening strip 24 is supported by a plateau region 44 of the sealant material layer 34 that does not extend over the full axial width of the noise dampening strip 24. Providing the plateau region 44 radially below the strip 24 with an axial extension that is narrower than the axial width of the strip 24, helps to save sealant material while still providing sufficient sealing properties. Moreover, the heat build-up below the strip 24 is further reduced. The bottom regions 54 have a smaller thickness than the plateau region 44 as discussed in relation to the embodiments of FIGS. 1 and 2. As can be seen in FIG. 7, the noise dampening strip can be wider on both of its axial sides than is the plateau region as measured from the axial center line (EP) of the tire.

Figure 8:
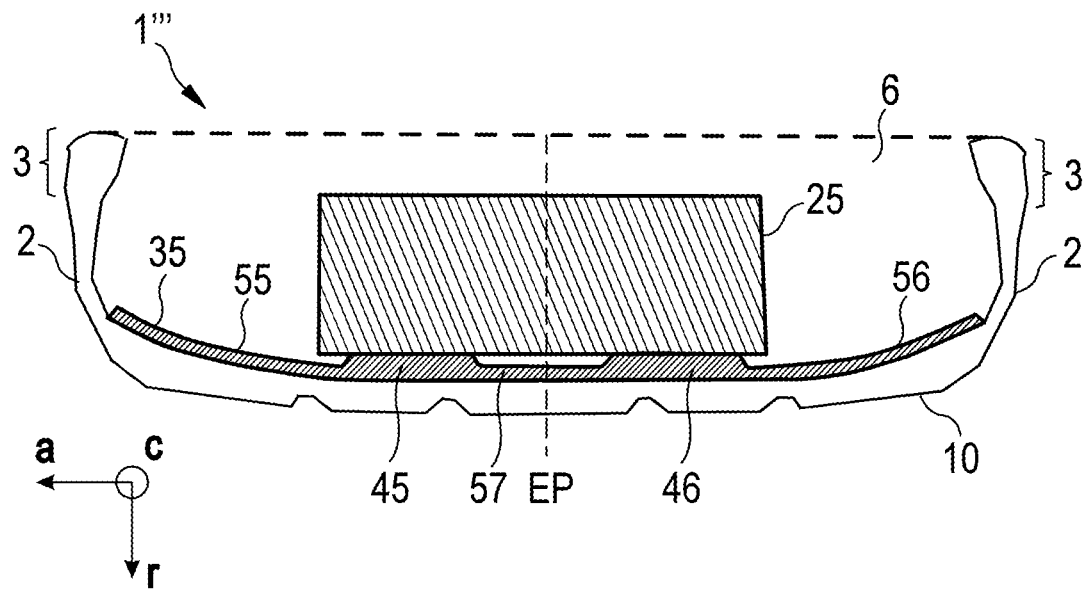
FIG. 8 shows a schematic cross section of another embodiment of a tire comprising a noise dampening strip attached to two plateau regions radially below the strip.

FIG. 8 shows yet another embodiment of a tire 1'''. As for FIG. 7, same reference numerals as in FIG. 1 have been used where applicable. In the embodiment of FIG. 8, a sealant material layer 35 has multiple (here two) plateau regions 45, 46 which extend radially out of the bottom regions 55, 56, 57. Such an embodiment may be of particular advantage in case of relatively broad noise dampening strips, such as strip 25, and may help to save sealant material while still ensuring appropriate puncture sealing properties. As is illustrated in FIG. 8, the plateau regions provide the sole support for the noise dampening strip. As the embodiment of the invention shown in FIG. 8 shows the sealant material layer can have only one plateau region, wherein the noise dampening strip is supported by two plateau regions, and wherein the two plateau regions can be separated from each other by a bottom region.

While certain representative embodiments and details have been shown for the purpose of illustrating the subject invention, it will be apparent to those skilled in this art that various changes and modifications can be made therein without departing from the scope of the subject invention.

What is claimed is:

1. A pneumatic tire comprising a tread portion, two bead portions, two sidewalls extending between the tread portion and the respective bead portions, an inner surface defining a tire cavity, a sealant material layer covering the inner surface radially below the tread portion within the tire cavity, a noise dampening strip which covers and is attached to the sealant material along a circumferential direction and on a radially inner side of the sealant material layer, wherein the sealant material layer has three bottom regions and two plateau regions, wherein the plateau regions provide support for the noise dampening strip, wherein the two plateau regions are separated from each other by a bottom region, wherein only the plateau regions of the sealant layer are in direct contact with the noise dampening strip, wherein the plateau regions extends only radially below the noise dampening strip and not axially beside the noise dampening strip, wherein the thickness of the plateau regions is 20% to 90% thicker than the thickness of the bottom regions, wherein the plateau regions have an essentially constant thickness, and wherein the sealant material layer has shoulder regions extending between the plateau regions and the bottom regions, and wherein the shoulder regions axially extend over less than 10% of the axial width of the sealant material layer.

2. The pneumatic tire of claim 1 wherein the noise dampening strip extends along a circumferential length which corresponds to at least 50% of an inner circumference of the tire measured along the inner surface at an axial center of the tire.

3. The pneumatic tire of claim 2 wherein the circumferential length corresponds to at least 80% of said inner circumference.

4. The pneumatic tire of claim 1 wherein the axial width of the noise dampening strip is within the range of 20% to 50% of the total axial width of the sealant material layer.

5. The pneumatic tire of claim 1 wherein the bottom regions have an essentially constant sealant material thickness measured perpendicular to the inner surface of the tire.

6. The pneumatic tire of claim 1 wherein the noise dampening strip is free of a coating or foil facing the sealant material layer and wherein the noise dampening strip is a polymeric foam material strip having a density within a range of 0.01 g/cm$^3$ to 1 g/cm$^3$.

7. The pneumatic tire of claim 1 wherein a thickness of the plateau regions is at least 15% larger than a thickness of the bottom regions.

8. The pneumatic tire of claim 1 wherein the sealant material layer is comprised of (A) an axially adjacent sealant material strips extending circumferentially about an axis of the tire and along the inner surface of the tire or (B) one or more sealant material strips which are spirally wound about an axis of the tire and along the inner surface of the tire.

9. The pneumatic tire of claim 8 wherein the sealant material strips have a larger thickness in the plateau regions than in the bottom regions and wherein multiple layers of strips are arranged on top of each other in the plateau regions.

10. The pneumatic tire of claim 1 wherein the plateau regions have a radial thickness which is in a range of 3 mm to 10 mm and the bottom regions have a thickness which is in a range of 2 mm to 6 mm.

11. The pneumatic tire of claim 1 wherein the plateau regions have an essentially constant thickness, and wherein the thickness of the plateau regions is 30% to 80% greater than the thickness of the bottom regions.

12. The pneumatic tire of claim 1 wherein the thickness of the plateau regions is 30% to 80% thicker than the thickness of the bottom regions.

13. The pneumatic tire of claim 12 wherein the thickness of the plateau regions is 40% to 70% thicker than the thickness of the bottom regions.

* * * * *